Sept. 21, 1943.　　　　L. F. HOPE ET AL　　　　2,329,835
BALANCING MACHINE WITH FIXED JOURNAL
Filed Sept. 29, 1939　　　　7 Sheets-Sheet 1
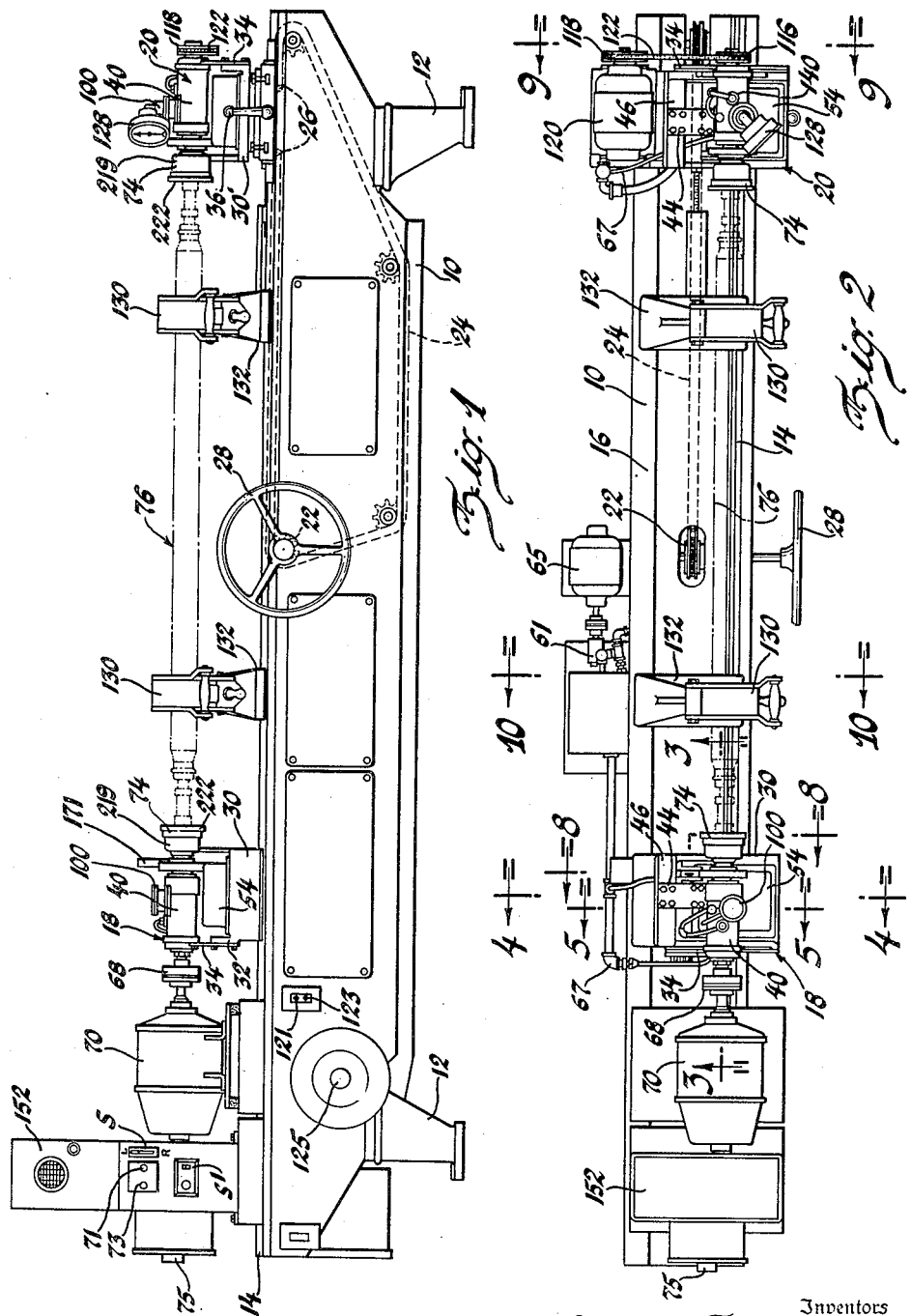
Inventors
Lawrence F. Hope
Paul Huber &
Thomas C. Van Degrift
Blackmore, Spencer & Hurd
Attorneys

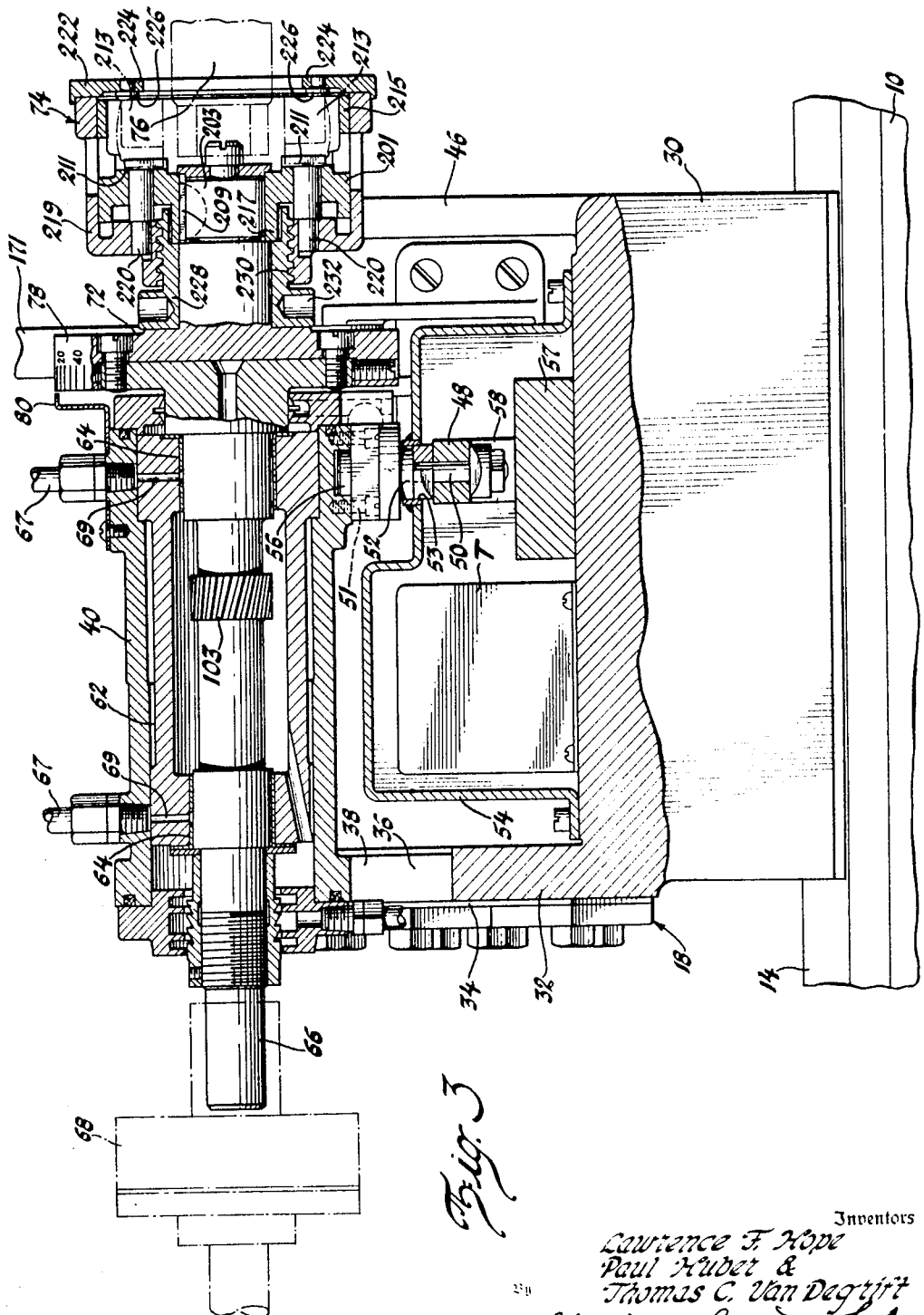

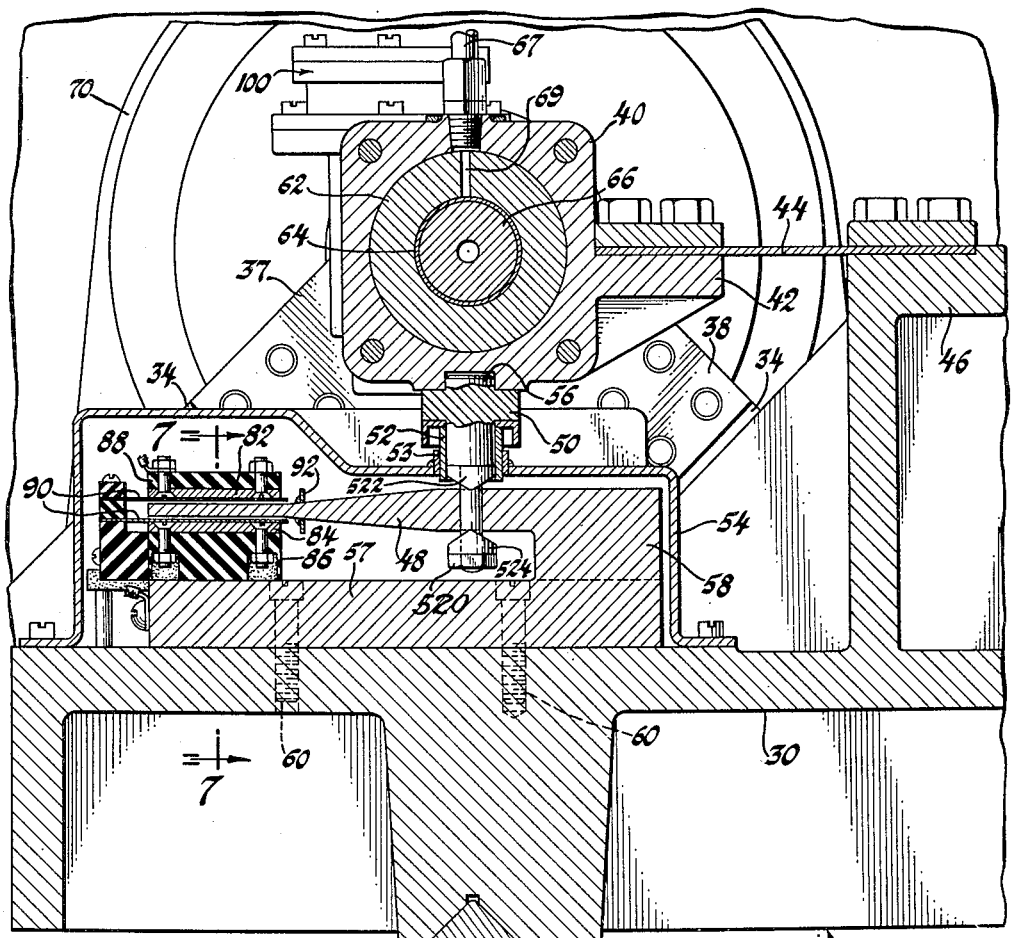
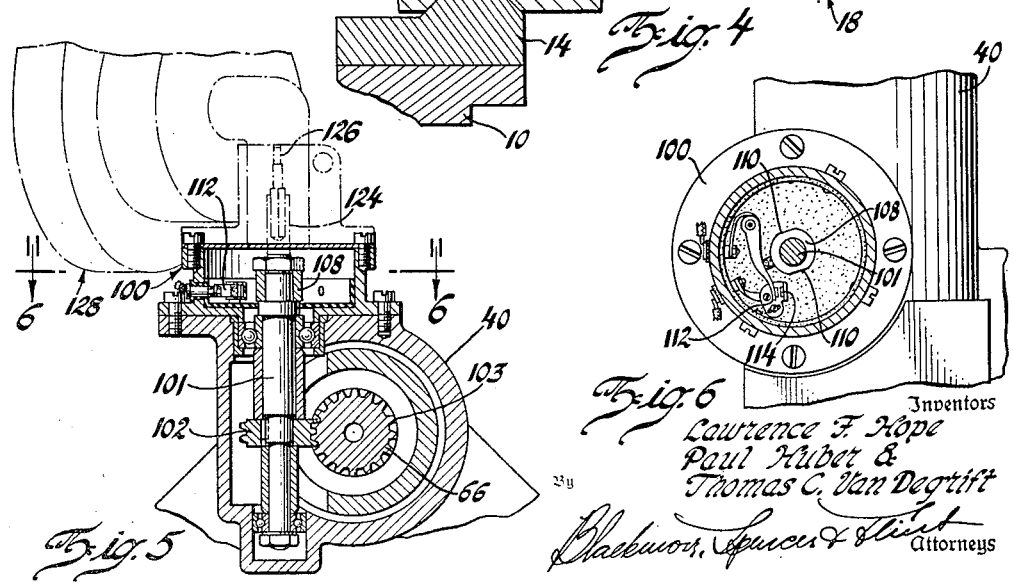

Sept. 21, 1943.   L. F. HOPE ET AL   2,329,835
BALANCING MACHINE WITH FIXED JOURNAL
Filed Sept. 29, 1939   7 Sheets-Sheet 4
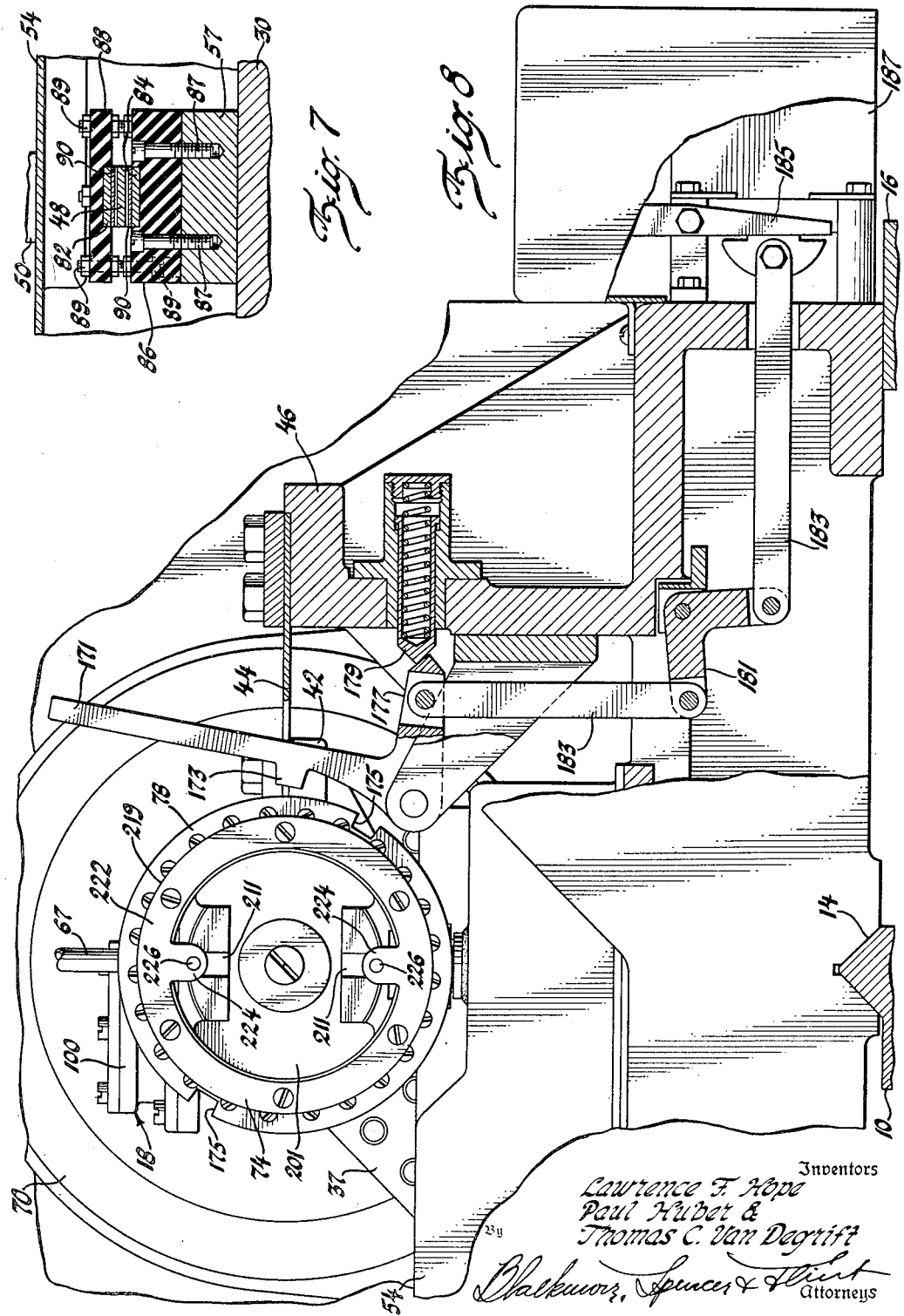
Inventors
Lawrence F. Hope
Paul Huber &
Thomas C. Van Degrift
By
Blakmor, Spencer & Flint
Attorneys

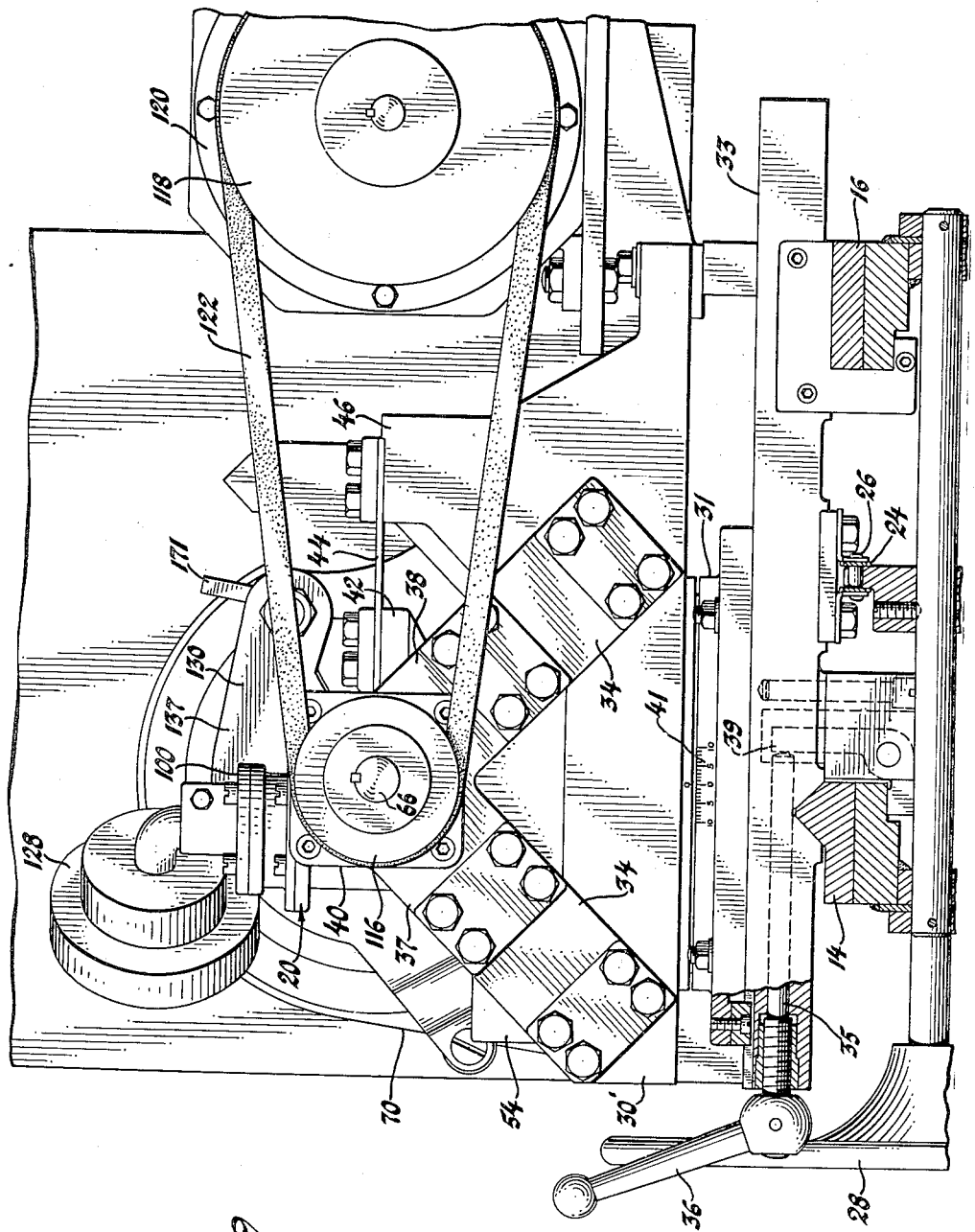

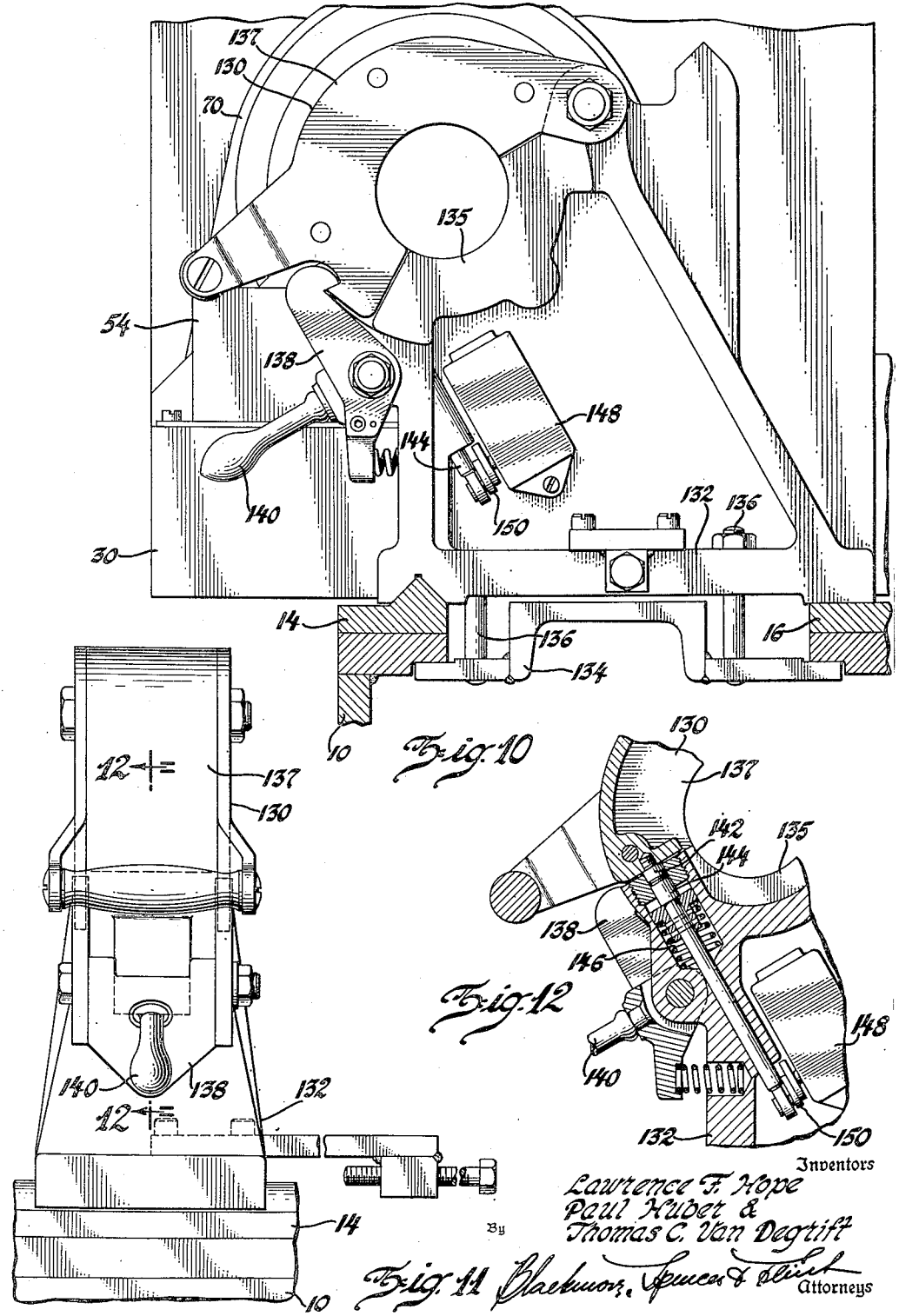

Patented Sept. 21, 1943

2,329,835

UNITED STATES PATENT OFFICE 2,329,835

BALANCING MACHINE WITH FIXED JOURNALS

Lawrence F. Hope and Thomas C. Van Degrift, Detroit, and Paul Huber, Milford, Mich., assignors to General Motors Corporation, Detroit, Mich., a corporation of Delaware Application September 29, 1939, Serial No. 297,082

8 Claims. (Cl. 73—53)

This invention has to do with improvements in balancing machines. The improved machines are characterized by greater sensitivity and simplified mechanical construction.

An important feature of the invention is the provision of relatively rigid supports for the ends of the shaft being balanced. The very slight deflections of these supports are made use of to effect changes in an electrical circuit which are amplified and then recorded or displayed by suitable indicating apparatus such as an oscillograph to give the amount of unbalance. The angle of unbalance is obtained by synchronizing the indicating apparatus with the rotation of the shaft.

The advantage of employing relatively rigid supports is that the damping of the shaft vibration by friction in the supporting parts is reduced and that the critical speed of the shaft is raised. It is, of course, desirable to rotate the shaft at or near its maximum service speed in order to obtain the same conditions as to balance and shaft deflection with speed and to get the largest possible unbalance force to facilitate measurement. The present machine permits these high rotation speeds by raising the critical speed, thus providing an even larger force due to unbalance, since this force increases with speed.

With relatively rigid supports for the part being balanced the amplitude of movement of the supports as a result of the action of the forces of unbalance is quite small and in the machine disclosed here is little more than .001" even under heavy unbalanced loads. This slight displacement is employed to vary the capacity or inductance of an electrical circuit, preferably the former, and by suitably amplifying the resulting change in voltage, a voltage is obtained which is sufficient to operate a suitable oscillograph producing a sine wave curve the amplitude of which varies directly with the amount of unbalance. Employing a suitable oscillograph of the cathode ray type it has been possible to obtain a sensitivity well over 1" amplitude per ounce inch of unbalance at 2500 R. P. M. and about four times this at the top speed of 5000 R. P. M.

The machine also includes a simple arrangement for determining the location of unbalance. This is accomplished by providing a circuit breaker operated by the rotating shaft and interrupting a direct current circuit connected to the oscillograph so as to lock the internal sweep of the oscillograph into synchronism with the rotating shaft.

The improved balancing machine is also characterized by simplicity and sturdiness of construction.

Various other objects and advantages of the invention will be pointed out in the course of the following description.

In the drawings:

Figure 1 is a side view of the machine showing in dotted lines a propeller shaft arranged in position to be tested.

Figure 2 is a top plan view of the machine of Figure 1.

Figures 3, 4 and 5 are sections taken on the corresponding lines of Figure 2.

Figure 6 is a section on line 6—6 of Figure 5.

Figure 7 is a section on line 7—7 of Figure 4.

Figures 8, 9 and 10 are views taken on corresponding lines of Figure 2.

Figure 11 is a front elevation of one of the guards used on the machine.

Figure 12 is a fragmentary section on line 12—12 of Figure 11.

Figures 13, 14:
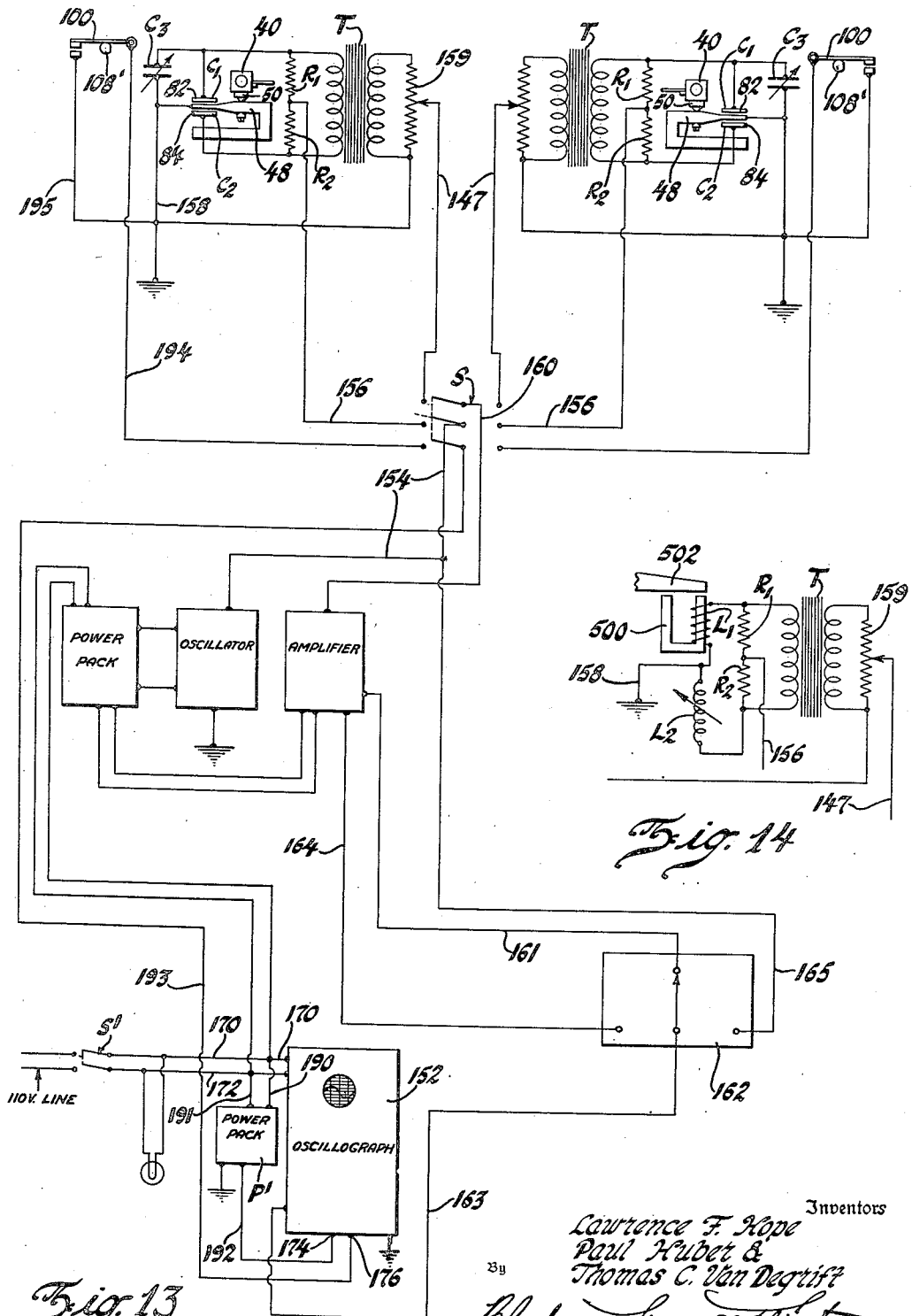
Figure 13 is a simplified schematic diagram of the electrical circuit employed.
Figure 14 is a diagrammatic view of a modified form of bridge circuit.

Referring to Figures 1 and 2, 10 indicates a suitable supporting base for the machine. The base is of rigid construction, supported by legs 12, and is provided with machined ways indicated at 14 and 16. On these ways are slidably mounted the heads 18 and 20. Any suitable means may be provided to lock the heads in the desired position on the ways. Usually it will be sufficient to adjust one only of the heads so sprocket 22 and chain 24 are provided to move the head 20, the ends of the chain 24 being suitably secured to the head as at 26. A hand wheel 28 is provided on the shaft carrying the sprocket 22 to facilitate adjustment. The heads 18 and 20 are of substantially the same construction so that the description of one will to a large extent suffice for both.

Head 18 consists of a base 30 supported on the ways as previously described. One end of the base 30 is provided with an upstanding flange 32 to which are bolted spring steel plates 34 extending toward each other at an angle as best shown in Figure 9. The free ends of plates 34 are bolted to flanges 37 and 38 extending radially from one end of shaft housing 40. The other end of housing 40 is provided with horizontal flange 42 to which is rigidly bolted a spring steel plate 44, the other end of which is clamped to the top of a pedestal 46 extending upwardly from the base 30 as best shown in Figure 4. The same end of housing 40 is rigidly secured to condenser arm 48 by means of a bolt 50 clamped to the arm 48 at one end by nut 520 as best shown in Figure 4, and at the other end to the housing 40 by means of bolts 51 as best shown in Figure 3. Attention is called to washers 522 and 524 encircling a shank of bolt 50. These washers are V-shaped on the sides engaging arm 48, thereby providing a knife edge connection between bolt 50 and arm 48 so as to insure that arm 48 will only be affected by vertical movement of the bearing 40 and not by transverse movement. 52 indicates a shield on bolt 50 which has a loose sliding fit in opening 53 in housing 54 and, together with the housing, protects the condenser and related parts to be hereafter described, from oil and dust. It has been found preferable to provide bolt 50 with pilot 56 fitting in a suitable socket provided in the underside of housing 40 to prevent shifting thereof.

Condenser arm 48 is in the form of a cantilever integral with support 57 having a rigid upstanding portion 58 at one end from which the condenser arm 48 projects. Support 57 is secured to the base 30 by suitable bolts 60.

Head 20 embodies the same details of construction just described but as shown in Figure 1, its base plate 30' is arranged oppositely on the ways 14 and 16 so that the ends of the housings 40 on the two heads which are supported by the spring plates 44 and the condenser arms 48 face each other. In addition, as shown in Figures 1 and 9, base 30' instead of being supported directly on ways 14 and 16 is carried by a turntable 31 mounted on support 33 which rests on the ways. Turntable 31 is suitably calibrated as at 41 to permit accurate adjustment of head 20 to the desired angle. The specific manner of mounting the turntable and locking it in place is not illustrated as this is conventional construction commonly used on machine shop equipment. It is believed to be unnecessary to illustrate the details of the turntable and its locking means since this is not novel with applicants. This adjustment has been found to be desirable in machines for balancing propeller shafts to permit testing of such shafts with the sections out of alignment when desired.

Any suitable means may be provided for locking the heads in the desired position of adjustment on the ways 14 and 16. There is illustrated in Figure 9 a screw 35 provided with a handle 36 and adapted to move pivoted locking dog 39 into clamping engagement with the underside of one of the ways as shown.

It will be noted that on both of the heads 18 and 20 plates 34 hold one end of housing 40 against any movement in the plane of the plates but will flex to permit housing 40 to tilt slightly upwardly or downwardly, the plates serving as a flexible hinge. Spring plate 44 strongly resists any movement of the other end of housing 40 except slight upward or downward movement. Any up and down movement of this end of the housing 40 is, of course, accompanied by corresponding movement of condenser arm 48 since the two are rigidly connected by bolt 50.

The parts are preferably so designed that even with shafts badly out of balance the maximum amount of movement of the condenser arm is but little more than .001".

Within housings 40, as is best shown in Figure 3, are mounted sleeves 62 provided at opposite ends with suitable babbitt lined bearings 64 for shaft 66. A constant speed electric motor 65 drives oil pump 61 which supplies oil under pressure to the bearings of both heads through supply pipes 67 and drilled passages 69. The ends of the shafts 66 and housings 40 are provided with suitable means such as oil traps, oil slingers and gaskets to prevent the escape of oil from the bearings.

The outer end of shaft 66 of head 18 is connected by suitable coupling 68 with electric motor 70 provided with buttons 71 and 73 for starting and stopping respectively and with rheostat 75 for adjusting its speed. It has been found preferable to employ a direct current motor to prevent interference with the circuit used for indicating the out of balance. Coupling 68 is preferably of the cushioned type, rubber balls or blocks being interposed between the driving and driven parts to prevent transmission of vibration to the part being tested.

To the inner end of each of the shafts 66 of the heads 18 and 20 is bolted adapter 72 carrying a chuck 74 arranged to engage and drive a propeller shaft such as that shown in dotted lines at 76 in Figures 1, 2 and 3.

The flange 78 of the adapter 72 may be calibrated in degrees as shown, so as to cooperate with a suitable pointer 80 secured to housing 40 for convenience in calibration as well as in determining the angular location of the unbalance in the shaft being tested.

Chuck 74 is shown in detail in Figures 3 and 8. It is adapted to receive and clamp one end of the usual propeller shaft. The chuck comprises an annular member 201 clamped to the end of the stub shaft extension 203 of adapter 72 and keyed to it by key 209. The forward face of member 201 is provided with concave seats 211 to receive journals 213 extending radially from the ends of conventional types of propeller shafts. Member 201 is provided with a forwardly extending axial flange 215 surrounding the end of the propeller shaft when in place in the chuck and also with rearwardly extending axial flange 217. To clamp the end of the propeller shaft in the seat 211 a cage 219 is provided surrounding the member 201 and guided for axial movement by pins 220 extending rearwardly from the member 201 The cage 219 has a forward flange 222 provided with inwardly projecting lugs 224 having stud 226 projecting rearwardly therefrom and adapted to engage the forward faces of the journal of the universal joint at the end of the propeller shaft 76 and clamp them in the seats 211 when the cage 219 is drawn rearwardly. Cage 219 is moved rearwardly by means of sleeve 228 rotatable on stub shaft 203 and held against endwise movement by engagement with the hub of annular member 201. Sleeve 228 has threaded engagement at 230 with cage 219 so that rotation of the sleeve in one direction causes the cage t move endwise on the pins 220 clamping th journals of the propeller shaft between lugs 22 and seats 211. Sleeve 228 is preferably provide with sockets 232 to receive the end of a bar tool to assist in rotating it.

In Figure 8 there is illustrated readily releasable means to lock shaft 66 against rotation t gether with automatic means to release the hol ing means. The locking is employed when i serting a shaft in chuck 74 or taking one out well as when making various adjustments. 1 indicates a hand operated bellcrank lever ha ing a projection 173 adapted to engage either notches 175 arranged 180° apart in the adapte Arm 177 of lever 171 is engaged by spring-press detent 179 to hold it either in engaged or dise gaged position. Arm 177 is connected by bell crank 181 and links 183 to pivoted lever 185, one end of which is the armature of electromagnet 187. The electromagnet is arranged in the starting circuit of motor 70 so that upon pressing the starting button 71 magnet 187 is energized, pulling armature 185 toward it and through the links and levers described disengaging lug 173 from notch 175 in the adapter 72 permitting rotation of shaft 66.

As best shown in Figures 4 and 7 the outer end of condenser arm 48 extends between two insulated condenser plates 82 and 84. Condenser plate 84 is secured to block 86 of insulating material secured to support 57 as by bolts 87. Condenser plate 82 is mounted on insulating block 88 secured to block 86 in spaced relation as by bolts 89 and suitable nuts as shown. 90 indicate thin sheets of mica interposed in the gap between condenser arm 48 and condenser plates 82 and 84 to prevent the entrance of dust. 92 indicates an oil shield surrounding the condenser arm 48 adjacent its point of entrance between the condenser plates and serving to shield the gap in the condenser from the entrance of oil. The parts constituting the condenser are covered over by housing 54 previously described which preferably also serves to house the resistors $R_1$ and $R_2$ hereinafter referred to.

On the housing 40 of the head 18 is mounted a circuit breaker 100 including a shaft 101 carrying gear 102 driven by gear 103 integrally formed on shaft 66 as best shown in Figure 5. Shaft 101 carries cam 108, having flat portions 110, as shown in Figure 6, permitting movable contact 112 to engage fixed contact 114 twice during each revolution of shaft 101. The gear ratio is such that the contacts 112 and 114 are closed once during each revolution of shaft 66. The circuit breaker illustrated is of the type commonly used in ignition systems of automobile engines.

It has been previously pointed out that head 20 is substantially the same in construction as head 18. A few differences have also been mentioned. The other differences of any importance will now be described. As is best shown in Figures 2 and 9, shaft 66 of head 20 is provided at its outer end with pulley 116 driven from pulley 118 on electric motor 120 by means of belt 122. This arrangement permits driving the shaft being tested from either end or from both ends as desired. However in practice it will be found most desirable to use motor 70 for driving the shaft, disconnecting motor 120 by removing belt 122. Motor 120 is used to drive shaft 66 of head 20 only when balancing the shaft, its adapted 72 and chuck 74. Motor 120 is controlled by starting and stopping buttons 121 and 123 at the left end of the machine and its speed is under control of rheostat 125.

Head 20 is provided with a circuit breaker 100 identical with that described in connection with head 18, except that as shown in dotted lines on Figure 5, the shaft 101 is connected by a suitable adapter 124 to flexible shaft 126 which drives speedometer 128.

Owing to the flexibility of propeller shafts there is a possibility of their becoming disconnected from the driving chucks at high speeds. To prevent this, guards are provided similar to those disclosed in Van Degrift Patent 2,008,161 granted July 16, 1936. Such guards are illustrated at 130 in Figures 1 and 2. One of them is shown in detail in Figures 10 and 12 where 132 indicates a base clamped to the ways 14 and 16 in any desired position by means of plate 134 and bolts and nuts 136. The guard consists of a fixed portion 135 integral with the base and a hinged section 137 adapted to be held in locked position by spring pressed dog 138 having a handle 140. To prevent operation of the balancing machine when the guard is unlocked, there is secured to the hinged section 137 a lug 142 that in the locked position of the parts engages plunger 144 normally urged upward by spring 146, and forces it downwardly to the position shown in Figure 12. Plunger 144 is connected to switch 148 by means of link 150, the arrangement being such that in the position of the parts shown in Figure 12, switch 148 opens the circuits of the driving motors. Two such guards are preferably provided spaced along the propeller shaft as shown in Figures 1 and 2.

In Figure 13 there is shown the preferred form of circuit employed. The circuit consists of two duplicate pickup and sweep locking circuits either of which may be connected through double throw switch S to the power supplying, amplifying and indicating circuits. Since the first named circuits are identical a description of one will suffice for both. In each circuit the two lobed cams 108 of the circuit breakers 100 have been replaced by single lobed cams 108' to indicate that the breaker is closed once during each revolution, thus avoiding the necessity of showing the 2 to 1 reduction gearing used with the two lobed cams in the machine as actually constructed.

48 indicates the condenser arm cooperating with condenser plates 82 and 84, condenser arm 48 being moved in synchronism with the part being balanced through its connection by pin 50 to journal housing 40. Condenser arm 48 forms with the plate 82 a condenser indicated at $C_1$ and with plate 84 a condenser indicated at $C_2$. These condensers form two arms of a bridge circuit of which the remaining two arms are constituted by resistances $R_1$ and $R_2$. When high frequency alternating current is applied across the bridge as hereinafter described any movement of condenser arm 48 will unbalance the bridge, thereby modulating the carrier wave in accordance with the vibration of the shaft. The modulated wave is then amplified and rectified, the high frequency wave is filtered out, and the output is supplied to an oscillograph 152, preferably of the cathode ray type, producing a sine wave, the amplitude of which is proportional to the amount of vibration of the part being balanced and hence to the amount of unbalance.

In order to obtain the greatest accuracy it is, of course, necessary to adjust the bridge so as to work on the linear part of the bridge curve. This adjustment may be effected by means of a variable condenser $C_3$ connected as shown across condenser $C_1$.

The necessary high frequency alternating current is obtained from a conventional oscillating circuit—designated as "Oscillator" on the drawing—preferably a 5,000 cycle Hartley type circuit supplied with direct current from a power pack as shown, which is supplied with 110 volt 60 cycle current from a power line through switch S'. Switch S' is preferably arranged at the left end of the machine as shown in Figure 1. High frequency current is supplied from the oscillator through lead 154 connected through the mid point terminals of switch S and thence through lead 156 to the point of connection of resistances $R_1$ and $R_2$. The connection of condenser arm 48 to ground through lead 158 completes the circuit.

The bridge output is then connected through transformer T and potentiometer 159, through the upper terminals of switch S, and lead 160 to the amplifier as shown. The amplifier preferably has two stages and with it is associated a suitable rectifier and filter for filtering out the high frequency wave. The details of the circuits of the power packs, oscillator, amplifier, rectifier, filters and oscillograph are not shown as they are well known in the art. The resulting rectified wave is supplied through lead 161, test switch 162 and lead 163 to oscillograph 152. For test purposes provision is also made for supplying unrectified current through lead 164, switch 162 and lead 163 to the oscillograph; or oscillating current direct from the oscillator through leads 154 and 165, test switch 162 and lead 163 to the oscillograph.

The oscillograph illustrated is of standard type provided with an internal sweep the frequency of which may be regulated to approximate the frequency of the force which is being measured. It is also provided with external sweep terminals adapted to be connected to a suitable impulse circuit to lock the internal sweep into synchronism with the force being measured after adjustment to approximate synchronism. A number of such oscillographs are available on the market. The particular one employed was a standard RCA Type TMV—122—B made by the Radio Corporation of America employing a three inch tube.

The oscillograph is supplied with current from the 110 volt line through suitable leads 170 and 172. 174 and 176 indicate the external sweep terminals of the oscillograph. Once each revolution of the shaft being tested an electrical impulse is supplied to the oscillograph through the external sweep terminals to lock its sweep in synchronism with the rotation of the shaft. The impulse is supplied by the following circuit: P' indicates a power pack supplied with energy from the 110 volt supply line through leads 190 and 191. From the power pack an impulse of direct current is supplied to the oscillograph with each closing of a circuit breaker 100 which has been brought in circuit by closing of switch S. Upon closing of the circuit breaker direct current flows momentarily from power pack P' through lead 192 to external sweep terminal 174, through the sweep locking position of the oscillograph circuit, out through terminal 176, lead 193, through the lower terminals of switch S, lead 194, circuit breaker 100, and lead 195 to ground the circuit being completed by grounding of power pack P'.

The operation of the complete machine will now be described.

With the shafts 66 of heads 18 and 20 locked in position by engagement of lugs 173 of levers 171 with notches 175 guards 130 are opened by releasing dogs 138 and raising the hinged portions 137. The shaft 76 is then inserted in position with its journals 213 resting on seats 211 in draw chucks 74. Sleeves 228 of the chucks are then rotated to draw lugs 224 on cages 219 into clamping engagement with the journals 213. The hinged guards 137 are now swung to locked position in which they are held by dogs 138. The result of this is to close the motor circuits at switches 148 through depression of plungers 144 and swinging of levers 150 connected to the switches. The machine is now ready for operation and may be set in motion by pressing switch button 71. This closes the motor circuit through solenoid 187 thereby withdrawing detent 173 from notches 175 by actuating armatures 185, links 183 and bell cranks 181 and 171, and thereafter setting the motor 70 in operation. The shaft now revolves.

It is assumed that switch S' has been closed to supply power to the oscillator and oscillograph so that upon swinging switch S to left or right as desired high frequency current is supplied by the oscillator to the bridge circuit through lead 156. This high frequency current is modulated by movement of condenser arm 48 in response to vibration of the shaft being tested. The modulated current is then fed through transformer T, potentiometer 159, lead 147, switch S and lead 160 to the amplifier, rectifier and filter unit, where it is amplified, rectified and filtered of its high frequency component and the resulting wave is supplied to oscillograph 152 through lead 161, switch 162 and lead 163, producing vertical displacement of the moving electron beam projected on the fluorescent screen of the oscillograph. The corresponding circuit breaker 100 closes once during each revolution of the shaft being tested thereby supplying an electrical impulse to the oscillograph once during each revolution through the external sweep terminals as previously described, thereby locking the internal sweep of the oscillograph in synchronism with the rotation of the shaft. The result is the projection of a standing sine wave on the screen of the oscillograph having a vertical displacement in proportion to the amount of unbalance and a horizontal displacement synchronized with the rotation of the shaft so that the screen may be calibrated vertically in amounts of unbalance and horizontally in shaft angle.

In Figure 14 there is shown a slight modification of the bridge portion of the circuit of Figure 13. Here condensers $C_1$ and $C_2$ are replaced by inductances $L_1$ and $L_2$ which, like the condensers, constitute substantially balanced members of the bridge circuit, the other legs of the bridge being constituted by the resistances $R_1$ and $R_2$ as before. The inductance $L_1$ is so designed that it is varied in accordance with the movements of the shaft due to unbalance. This may be accomplished in a number of ways. We have shown at 500 a U-shaped iron core for the inductance $L_1$ provided with an armature 502 in the form of an arm connected to move with the bearing 40 of the balancing machine in the same manner as condenser arm 48, shown in the previous figures. Inductance $L_2$ is shown diagrammatically as a variable inductance. It may be provided with a core of the same type shown at 500. It will be evident that movement of arm 502 will vary the inductance $L_1$, thereby unbalancing the bridge circuit and producing a reading of unbalance in the oscillograph 152 in the same manner as in the case of the variable condensers $C_1$ and $C_2$ of Figure 13.

The bridge circuit of Figure 14 is to be connected to the remainder of the circuit of Figure 13 in the same manner as the bridge circuit illustrated in the latter figure.

We claim:
1. In a balancing machine, means for supporting and rotating a part to be balanced comprising a base, a journal box, supporting means spaced along the journal box connecting it to the base one of said supporting means being flexible in direction to permit limited axial movement of the journal box but inflexible radially to resist radial movement, the other supporting means being flexible in a direction to permit limited radial movement of the box but inflexible axially to resist axial movement, said last-named supporting means comprising a cantilever secured to the base and supporting the journal box adjacent its free end, and a plate mounted on said base and spaced from the free end of said arm and cooperating therewith to form a condenser.

2. In a balancing machine the combination of a base, a journal box, means for mounting the journal box at one end on the base comprising a pair of leaf springs secured to the journal box adjacent one end and extending radially therefrom and lying substantially in a plane at right angles to the axis of the journal box and having their opposite ends secured to the base, means for mounting the other end of the journal box on the base comprising a leaf spring extending radially from the box and lying substantially in a plane extending axially of the journal and having its ends secured to the box and to the base, and a cantilever secured to the base and having its free end supporting the box.

3. In a balancing machine the combination of a base, a journal box, means for mounting the journal box at one end on the base comprising a pair of leaf springs secured to the journal box adjacent one end and extending radially therefrom and lying substantially in a plane at right angles to the axis of the journal box and having their opposite ends secured to the base, means for mounting the other end of the journal box on the base comprising a leaf spring extending radially from the box and lying substantially in a plane extending axially of the journal and having its ends secured to the box and to the base, a cantilever secured to the base and having its free end supporting the box, and a plate mounted on the base cooperating with the free end of the cantilever to form a condenser.

4. In a balancing machine the combination of a base, a journal box, means for mounting the journal box at one end on the base comprising a pair of leaf springs secured to the journal box adjacent one end and extending radially therefrom at divergent angles and lying substantially in a plane at right angles to the axis of the journal box and having their opposite ends secured to the base, means for mounting the other end of the journal box on the base comprising a leaf spring extending substantially horizontally from the box and lying substantially in a plane extending axially of the journal box and having its ends secured to the box and to the base, and a cantilever secured to the base and having its free end supporting the box.

5. In a balancing machine the combination of a base, a journal box, means for mounting the journal box at one end on the base comprising a pair of leaf springs secured to the journal box adjacent one end and extending radially therefrom at divergent angles and lying substantially in a plane at right angles to the axis of the journal box and having their opposite ends secured to the base, means for mounting the other end of the journal box on the base comprising a leaf spring extending substantially horizontally from the box and lying substantially in a plane extending axially of the journal box and having its ends secured to the box and to the base, a cantilever secured to the base and having its free end supporting the box, and a pair of plates mounted on the base and extending on either side of the free end of the cantilever to form condensers therewith.

6. In a balancing machine the combination of a base, a pair of journal boxes axially aligned and spaced from each other, said journal boxes being adapted to receive and support between them a part to be balanced, each of said journal boxes being provided with supporting means spaced therealong connecting it to the base, the adjacent supporting means being flexible in a direction to permit limited radial movement but inflexible axially to resist axial movement, the other pair of said supporting means being flexible in a direction to permit limited axial movement but inflexible radially to resist radial movement, said adjacent supporting means each comprising a cantilever secured to the base and supporting a journal box adjacent its free end.

7. In a balancing machine the combination of a base, a pair of journal boxes axially aligned and spaced from each other, said journal boxes being adapted to receive and support between them a part to be balanced, each of said journal boxes being provided with supporting means spaced therealong connecting it to the base, the adjacent supporting means being flexible in a direction to permit limited radial movement but inflexible axially to resist axial movement, the other pair of said supporting means being flexible in a direction to permit limited axial movement but inflexible radially to resist radial movement, said adjacent supporting means each comprising a cantilever secured to the base and supporting a journal box adjacent its free end, and indicating means actuated by movement of the free end of said cantilever.

8. In a balancing machine the combination of a base, a pair of stub shafts axially aligned and spaced from each other, said shafts being adapted to be connected to the ends of a part to be balanced, means associated with each of the shafts for supporting it from the base comprising a journal box provided with supporting means spaced therealong connecting it to the base, the adjacent pair of supporting means being flexible in a direction to permit limited radial movement but inflexible axially to resist axial displacement, the other pair of supporting means being flexible in a direction to permit limited axial movement but inflexible radially to resist radial displacement, said adjacent pair of supporting means each comprising a cantilever secured to the base and supporting the box adjacent its free end, means for rotating one of the shafts together with the part to be balanced, and indicating means actuated by movement of the free end of the cantilever produced by rotation of the part which is out of balance.

THOMAS C. VAN DEGRIFT.
LAWRENCE F. HOPE.
PAUL HUBER.